March 15, 1966 A. W. TYLER 3,240,119

DATA RETRIEVING APPARATUS

Original Filed July 26, 1960 5 Sheets-Sheet 1

INVENTOR.
ARTHUR W. TYLER

BY Stanley Belsky
ATTORNEY

March 15, 1966 A. W. TYLER 3,240,119

DATA RETRIEVING APPARATUS

Original Filed July 26, 1960 5 Sheets-Sheet 2

INVENTOR.
ARTHUR W. TYLER
BY Stanley Belsky
ATTORNEY

INVENTOR.
ARTHUR W. TYLER
BY
Stanley Belsky
ATTORNEY

DATA RETRIEVING APPARATUS

Original Filed July 26, 1960

INVENTOR.
ARTHUR W. TYLER
BY Stanley Belsky
ATTORNEY

INVENTOR.
ARTHUR W. TYLER
BY Stanley Belsky
ATTORNEY

United States Patent Office 3,240,119
Patented Mar. 15, 1966

3,240,119

DATA RETRIEVING APPARATUS

Arthur W. Tyler, Weston, Mass., assignor to Itek Corporation, Lexington, Mass., a corporation of Delaware Original application July 26, 1960, Ser. No. 45,438, now Patent No. 3,096,882, dated July 9, 1963. Divided and this application Dec. 3, 1962, Ser. No. 241,802
5 Claims. (Cl. 88—28)

This application is a division of my copending application, Serial No. 45,438, filed July 26, 1960. This application is now United States Patent No. 3,096,882 that issued on July 9, 1963.

The present invention generally concerns a data processing system and more particularly relates to a pneumatically actuated file for automatically classifying, arranging, and retrieving a large plurality of physically similar, but individually and distinctively encoded information-bearing sheets such as film chips; all of these operations taking place within a closed system.

For general informational background in this art, reference is made to the system aspects of apparatus for locating and retrieving information-bearing sheets in the form of bits or chips of film which has been described in co-pending applications Serial No. 839,648 of Manfred R. Kuehnle, now United States Patent No. 3,045,529 issued that on July 24, 1962, and Serial No. 843,132 of Manfred R. Kuehnle et al., now United States Patent No. 3,042,-201 issued on July 3, 1962 both of which are assigned to the assignee of the present invention.

In both of these co-pending applications there is described a basic information-carrying element comprising an image-bearing film chip provided with a codable area upon which a unique identification code may be arranged. Another edge is formed, preferably, with a re-entrant notch, such as a T-shaped cutout which adapts the chip for mounting on a holding rail having a generally mating configuration, namely, a T-shaped cross-section slightly smaller than the T-notch. The rail may, in turn, be mounted in such a way as to be driven along a longitudinal axis while carrying a large number of chips, or alternatively, it may be circular and fitted to the periphery of a drum to be rotated with its respective chips.

The earlier of the above cited applications disclosed a system capable of isolating a single data-bearing, coded film chip at high speed, from a plurality of like chips arranged on a movable support, such as a rotary drum. Means were provided to permit the selection of a predetermined film chip by its coded designation. Thus, an electrical signal corresponding to the code of a desired chip was transmitted to a comparator from a keyboard, or a like input accession device. A sensing transducer, arranged to read the code of each chip, transmitted a corresponding signal to the comparator for each succeeding chip. When the transducer input signal to the comparator was the same as that programmed by the accession device, a control signal was transmitted from the comparator to a control center where a sequence of relay-controlled-operations caused the desired chip to be isolated. More specifically, in that system, the outer cylindrical surface of the rotatable drum supported a holding rail; the chips and drum together comprised a removable magazine. Typically, each film chip was provided with a support, such as a re-entrant notch in one edge thereof, sufficiently large in respect to the rail cross section to permit each chip, when secured to the rail, to slide freely and to pivot or hinge approximately 90° thereon.

The drum and rail on which the chips were mounted could rotate in either direction; motive power being derived from a suitable motor drive mechanism. Two angularly separated air jets were arranged at the outer periphery of the cylindrical array of chips, the jets being respectively derived from a detection jet head and an isolation jet head oriented to alternately furnish independently controllable jets of air pointed at the chips from opposite directions. The two air jet heads were additionally arranged so that both could be physically withdrawn from their operating position to permit access to a selected chip.

The film chips were each individually coded on magnetic striping situated along one flat surface adjacent a long edge, each code being in the nature of a unique binary pattern of magnetic bits. For such magnetically coded chips, a magnetic transducer or reading head for sensing the coded edges was provided adjacent the coded edges. During drum rotation, each chip was both driven and blown past the reading head by the combined effect of the drums rotation and the force of one of the air jets. Since each of the chips was thus effectively pivoted past the magnetic transducer, each magnetic bit had a different relative velocity with respect to the reading head. As a result, the voltage induced in each channel of the reading head varied progressively as a function of bit position lengthwise along th magnetic striping.

Upon the selection of the designation of a predetermined chip at the accession device, the chip magazine, as described, was driven past a reading head in a fast detection run until a signal pattern in the sensing transducer derived from the desired chip caused transmission of a signal from the comparator to the control center. The center initiated a sequence of pulses which stopped the magazine, reversing its direction for a comparatively slow isolation run. Because of the mass and velocity of the magazine, however, it could not be stopped precisely as the desired chip passed the reading head. The isolation step served to remove the chips covering that particular one desired.

Optical apparatus capable of limited radial displacement was associated with the drum drive, air heads and transducer, for displaying or reproducing the desired information on the face of the selected chip. During chip detection and isolation, the optical apparatus was withdrawn to avoid interference with searching. However, when the desired chip was isolated, the optical apparatus moved radially inward to perform its function in response to a control center signal pulse.

In the system as described generally above, the selected chip remained on its holding rail, the optics having been arranged to engage the chip and display the information contained on the fact thereof. Thus, while the desired data could be rapidly located and read or reproduced, the latter operation was necessarily performed at the expense of searching time. This limitation is particularly critical if it is desirable to view the selected data for a considerable length of time, and also if selection is to be made for the purpose of removing the selected film chip, either for use elsewhere, or because that chip is no longer needed in the particular chip grouping.

In the latter of the two co-pending applications, apparatus is provided which permits the retrieval or actual removal of a particular data bearing chip after it has been effectively isolated from the others in the system. Once isolated, the desired chip was caused to assume a position where it could be retrieved and removed for subsequent utilization.

Basically, the isolation, retrieval, and removal apparatus included a series of levers which were sequentially brought into position to engage the top edges of the chips upon initiation of the reverse, or isolation run. When the desired chip was located it was placed in an upstanding position whereby a retriever arm on each side of the chip, in conjunction with the air jet means could remove the chip from the holding rail.

In order to retrieve the chip, the holding rail was adapted to permit the selective, physical release of any particular chip. This was accomplished by a holding rail which conformed to the open notch at the lower edge of each chip, thereby holding the chip securely during the stages immediately preceding retrieval. But the rail was also flexible and compressible transversely of its main axis. Thus, with the selected chip securely engaged by the two retriever arms, a cam or like mechanism could compress the holding rail adjacent the located chip. This change in configuration, in turn, freed the selected chip so that the retriever arms could remove the selected chip from the rail.

In contrast with the two techniques described in the foregoing, the present invention provides means for locating, isolating and viewing individual data bearing sheets in a wholly enclosed network conveniently allowing the utilization or retrieval of information from the sheets while the sheets remain within the system.

Basically, the invention involves the processing of a data-bearing entity which has a code, magnetic or optical, distinguishing any one singular unit from a plurality of physically similar units. Means are provided in conjunction with a fluid pressure gradient for guidably propelling or displacing the data-bearing entities with the plane of each sheet angularly disposed relative to its direction of motion. Apparatus embodying the invention can be arranged for classifying, collating and sorting a multitude of these comparatively small, substantially two-dimensional entities, such as sheets of paper, film, metal, or plastic, having maximum data density on one or both surfaces.

More specfically, the data-bearing unit of the preferred embodiment of the invention described herein is a film chip with means at one edge for mounting on a guide rail and having a magnetically codable striping on another edge thereof. Each chip has a unique identifying binary-type code impressed upon its codable edge. Magnetic transducer devices are operatively positioned in respect to the coded chip edges to sense the magnetic pattern of individual chips.

The guide rail is secured to the inside of a hollow rectangular guide duct; one dimension of the duct's cross section is just slightly greater than the width of the chip while the other dimension is considerably less than the length of the chip. The chip is supported and propelled through the duct by a stream of air. The mounting arrangement constrains the chip from tumbling while the fore-shortened dimension of the duct, in conjunction with the pressure of the air stream, causes the chip to assume an angular position in respect to the normal cross section thereof. In this oblique position the chip effectively blocks the passage of the air causing the chip to slide parallel to itself through the duct with the air stream.

The chips are introduced singly into the ducts. The transducer devices are positioned in the duct to identify chip designation codes as the chips are blown past, one by one. Coincidence circuitry in a comparator unit connected with an accession device and the transducer permits selection of a predetermined chip. The accession device translates a human-readable code designation into a corresponding electrical signal which is transmitted to the comparator device having the coincidence circuitry. When each chip passes a transducer, the latter puts out a signal corresponding to the chip's code designation. But only when the selected chip passes the transducer head will there be a signal from the comparator, equivalent to the previous signal put there by the accession de-the comparator generates a control signal which may be vice. Accordingly, for a predetermined, selected chip, transmitted to a control center wherein a preset control pulse sequence effects the disposition of the particular chip.

This permits a wide variety of identification, viewing and sorting possibilities. In one case air may be delivered to the duct in such a way as to cause individual chips to pivot past the magnetic transducer or reading head, which chips are then forced toward the end of the duct for collection. It becomes possible to have a circuit or network comprising multiple ducts, each connected by switches from one duct to a plurality of other ducts. By programming the switches among the various ducts in conjunction with the operation of the transducer and comparator devices and a film chip retarding trap, predetermined chips may be caused to be propelled to a particular duct for collection in a single category; and chips in branches may be combined, sorted and collated.

As already noted, this system can be used as a complete, self-contained and integrated scheme for handling film chips. For example, a transparent section of the duct may be arranged to accommodate an optical system to permit viewing of any particular chip while the chip remains in the duct. The optical system as well as a transducer head located adjacent thereto can be constructed on a "main-line" section of duct for sequentially viewing a multitude of chips, converging from feeder ducts which bring together chips from several sources. Ducts radiating from this "main-line" may in turn be utilized to distribute chips from a common source to several other locations.

Certain advantageous features of this arrangement are evident. Because the operation is largely pneumatic, there is a minimum of complex mechanical and electromechanical components.

Irrespective of the code form, the high speed sorting, collating, examination and retrieval processes of this apparatus can employ a high-speed, automatic sensing system arranged so that each individual unit data-sheet may be directed according to a predetermined program.

Friction and other forms of contact of the information carrying surface are either avoided or maintained. Also, the minimal mass and weight of the chip and the small amount of friction of its edges against the duct necessitate an unexpectedly small pressure gradient to transport the chip. For the same reasons the chip will move along the duct with substantially the same velocity as the air stream. When a fully enclosed duct is employed, deterioration of the data surface from abrasive particles can be minimized. Regardless of the duct structure, a network can be constructed to create a system capable of handling either small or large stores of information-bearing units and permits of broad versatility in application.

In summary, then, the invention comprises a means for transporting film chips along a predetermined path with controlled angular orientation throughout under the influence of fluid flow, or a fluid pressure gradient. More specifically, a hollow duct determines the path and a pneumatic source creates a gradient within the duct. The data sheets have means such as a notch which mates with the cross-section of a guide track formed longitudinally inside the duct. Thus, the chips may be introduced one by one into the fluid stream and are guidably propelled through the duct in a manner whereby the plane of the chip's surface is constantly normal to a wall of the duct. In other words, the plane of the surface of each sheet has a substantially constant angle as it is displaced along the guide track. Coded identification means are provided on each sheet which can be read off the edges by appropriate sensing means.

Other objects and features of the invention will thus be understood from the following detailed description when read in conjunction with the accompanying drawings in which.

Figure 5:
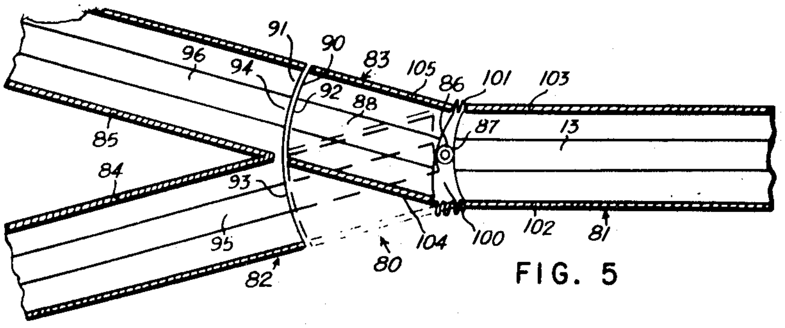
Figures 6, 6A:
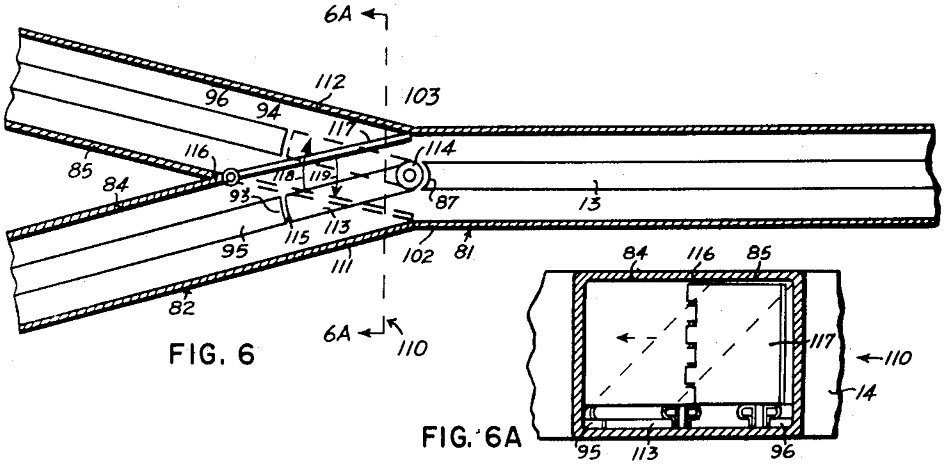
Figure 7:
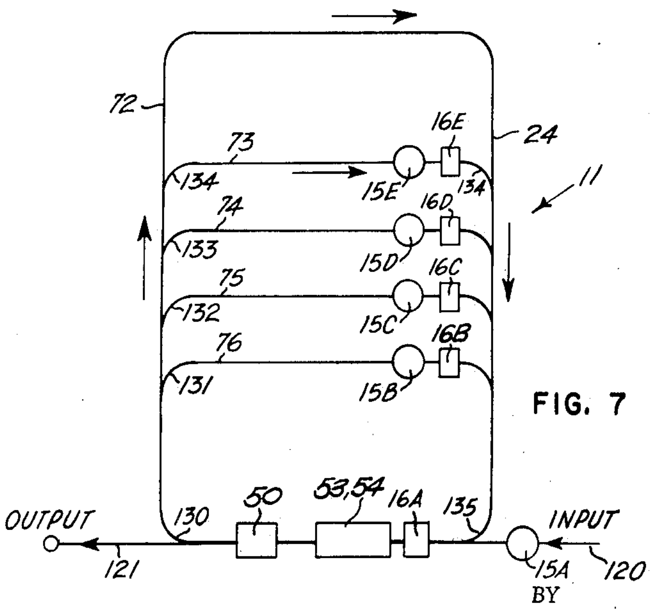
Figures 8, 8A:
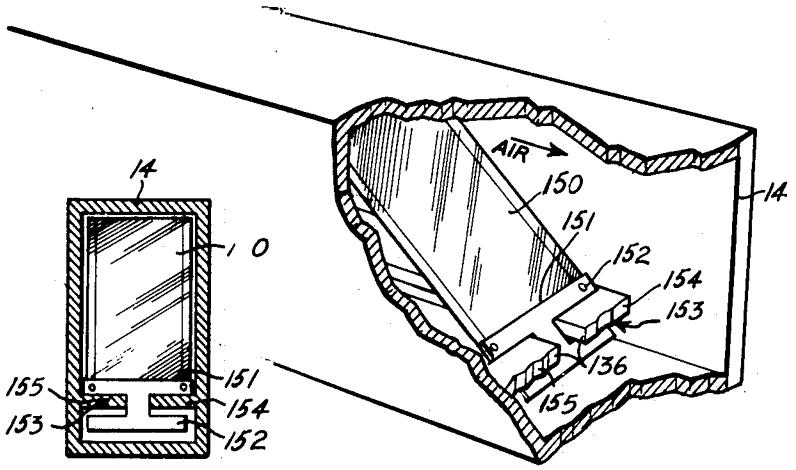
Figure 9A:
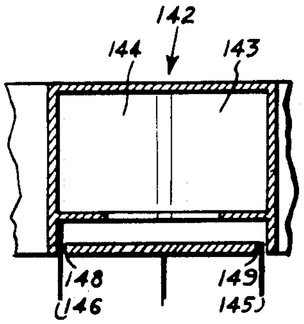
Figure 9:
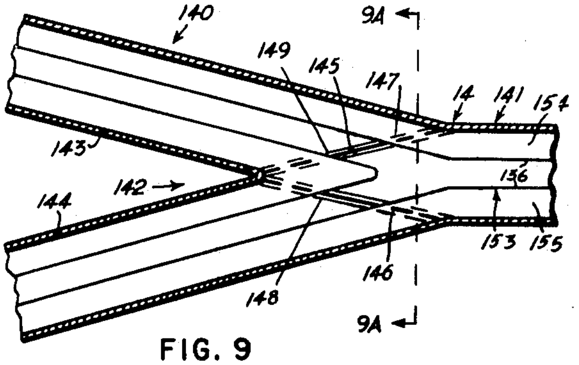

FIGS. 5 and 6 indicate alternative means for accomplishing switching from a single duct to two or more ducts;

FIG. 6A is a cross-section of a switch taken on plane 6A—6A of FIG. 6;

FIG. 7 is a schematic representation of a multitude of parallel ducts which feed, by means of switch connections, to a main line containing transducer reading head and viewing optics;

FIG. 8 is a perspective view, partially cut away, of a film chip alternatively provided with a T-shaped terminal at one end which fits a slotted guide track within a pneumatic duct;

FIG. 8A is a face view of the film chip mounting method disclosed in FIG. 8;

FIG. 9 is a diagrammatic section of a switch for the film chip of FIG. 8, and illustrates the junction between a single duct and two ducts;

FIG. 9A is a section taken on plane 9A—9A of FIG. 9; and

Figure 10:
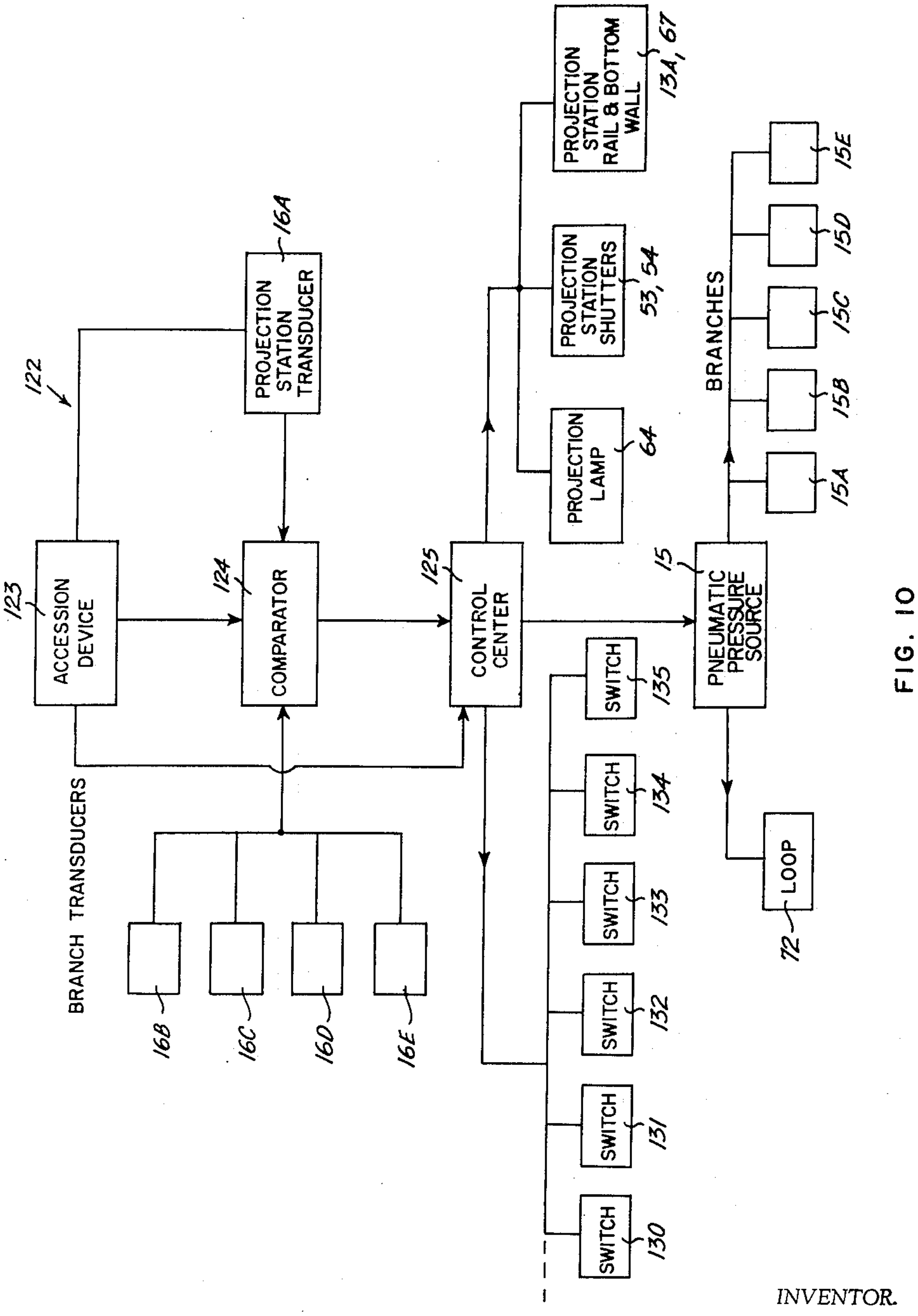

FIG. 10 is a block diagram of a logical and control system for the duct network shown in FIG. 7.

Figures 1, 1A:
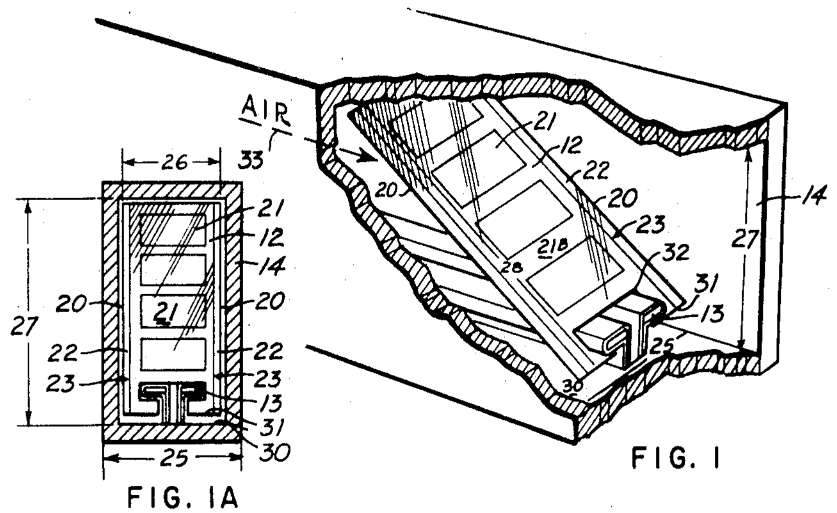
FIG. 1 is a perspective view, partially cut away, of a film chip mounted on a guide rail which is contained within a rectangular pneumatic duct.
FIG. 1A is a front view of the film chip and duct shown in FIG. 1.
Figure 2:
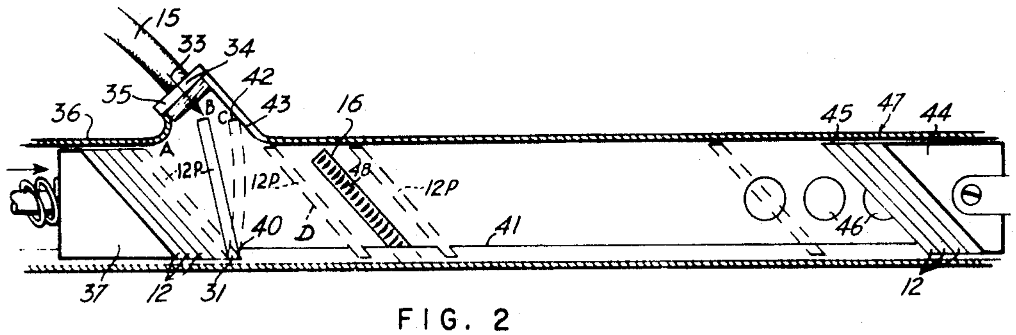
FIG. 2 is a diagrammatic representation of how air may be introduced into one of the ducts illustrating a transducer device for reading the chip edges and a member for advancing the film chips into the air stream.

In its general organization as shown in FIGS. 1, 2, and 7, a filing system embodying the principles of this invention utilizes a plurality of data-bearing sheets 12 which are propelled along track 13 through a guide duct 14 by a source of air pressure 15. Transducer means 16 are positioned in the duct network to sense the coded data sheets 12.

In this embodiment each data-bearing sheet 12 consists of a small bit or chip of film and will henceforth be described as a film chip 12. It is to be understood, however, that the invention is not limited to film but may utilize any sheet material of any shape suited to being propelled, guided and otherwise readily handled in a pneumatic system.

The film chip may be provided with any identification means consistent with an in-system detection and utilization. The invention, in fact, allows for considerable flexibility in identification technique because either edges 20 or surface 21 of the film chip 12 may be used for identity designation purposes. For example, magnetic material 22 can be employed either on the surface 21 or as a stripe 23 at one or both edges 20. Optical coding, although not shown, is also feasible, placed either near the edges 20 or on one of the surfaces 21.

In the preferred embodiment described herein, the film chips 12 are severed from a roll of exposed photographic film having a ferric-oxide magnetic striping 23 on the base side 21B of the film near the edges 20 thereof. The properties of the striping 23 permit coding of each chip 12 by transverse magnetization of segments, such segment representing a single bit of a code, the various patterns of magnetization being different for individual chips. It has been feasible to employ 16 mm. film severed into lengths of approximately two inches. A typical magnetic transducer sensing unit 16 has fourteen reading heads per inch which permits a two-inch chip to have up to twenty-eight code bits, yielding $2^{28}$ possible combinations if a single ferric-oxide stripe 23 is used.

The magnetic transducer devices 16 for reading the coded striping 23 are provided at various points within a network 24 of guide duct 14. As will be described in greater detail below, the particular transducer means employed in this embodiment are operatively positioned within the duct 14 in respect to the coded edges 20. It should be emphasized that since either or both optical or magnetic codes are feasible, the nature of the code on a chip 12 in a particular system is an initial design choice. In this particular system, transducer devices 16 such as the magnetic reading head shown diagrammatically in FIGS. 2, 3, and 4 and schematically in FIG. 7, are arranged at various points in the duct network 24 to sense the magnetically edge coded designation of chips 12 passing in proximity thereto.

The pneumatic guide duct 14, apart from certain dimensional specifications which are explained below, may be made from almost any material which can be fashioned into a substantially enclosed structure. Standard, commercially available extruded rectangular metal duct is suitable, of course, or it may be advantageous in terms of light weight to employ extruded plastic.

As will be seen in FIG. 1A the width 25 of the guide duct 14 very closely approximates the width 26 of the film chip 12, being only slightly greater than the width of the chip. However, as will be seen in FIG. 1, the height 27 of the duct 14 is substantially less than the larger dimension 28 of the rectangular chip 12, causing the chip to assume the oblique, angular or tilted position indicated in perspective in FIG. 1 and in profile in FIGS. 2 and 3.

A guide rail or track 13 for the chips 12 is secured to an inside surface 30 of the duct 14. As will be seen in FIGS. 1 and 1A the track 13 is a T-shaped rail in cross-section. One edge 31 of each of the chips 12 is cut out to form a substantially T-shaped re-entrant notch 32. Thus, the notch 32 permits the individual chips 12 to be slideably and hingeably mounted on the track 13. While the configuration of the rail forming the track 13 need not be precisely identical with the configuration of the notch 32, the angular cross-section dimensions of the track taken on the same plane as the chips angular position are somewhat less than the corresponding dimensions of the notch to permit the chip to slide and hinge readily with minimum friction.

Individual chips 12 are supported and propelled along the guide track 13 through the duct 14 by a stream of air indicated by the arrow 33 in FIG. 2. The T-shape of the rail 13 constrains the chips 12 from tumbling while the foreshortened vertical dimension 27 of the duct 14, in conjunction with the pressure of the air stream 33 causes the chips to assume an angular position in respect to the longitudinal axis of the duct. In this position, a chip 12 effectively blocks the passage of air in the duct 14 which causes it to slide through the duct responsive to the air pressure gradient. As already noted, the cross-sectional size (taken on an angular plane parallel to the position of the chip) of the rail track 13 is preferably somewhat less than the corresponding dimensions of the notch 32 at the lower edge 31 of each chip 12, thereby minimizing the friction between the chip and the rail. The weight of the chip 12 and its friction against the duct 14 when in motion are both extremely small so that very little air pressure gradient across the chip is required to transport it. Consequently, a chip 12 will move through the duct 14 with substantially the same velocity as the air stream 33. Chip velocities of an order of magnitude of 700 inches per second have been achieved with relatively small air pressure magnitudes. Moreover, apparent deterioration due to friction was substantially negligible. It should be emphasized that the chip 12 need not make a close fit inside the duct 14 for proper operation.

Illustrated in FIG. 2 is a mechanism for feeding the chips 12 singly into an air stream. The air stream indicated by the arrow 13, is introduced through an aperture 34 in a wall 35 of the duct 14 opposite the internal track 13. The chips 12 are fed into the duct 14 as a group through an extension 36 by any suitable means such as an advancing mechanical plunger 37 shown diagrammatically. As a particular chip 12P reaches the position A indicated in FIG. 2, the action of the incoming air 33 causes it to begin to pivot from its oblique static position at A through successive positions B and C. A small step 40 on the surface 41 of the rail 13 facilitates this pivoting action but is not required for it. When the top edge 42 of the chip 12P abuts the wall 43 of the air inlet 34 the air pressure is effectively behind the chip, and at position C the chip 12P is substantially blocking the air flow.

Having reached position C, the chip 12P tends to bend under the pressure of the air stream 33 which, in turn, tends to raise the lower, notched end 31 to rise above the slight step 40 and slide along the rail 13 toward position D. The chip 12P is now angularly positioned within the duct 14 and will be displaced through the guide duct by the air pressure gradient until stopped by a baffle 44 at the end of the duct 14 or a pile 45 of preceding chips 12. Holes 46 towards the end 47 of the duct 14 near stopping baffle 44 permit the air to escape while still maintaining sufficient pressure to collect the chips 12 as a group 45 at the end 47 of the duct section. Basically, the system is "leaky," that is, the chips 12 need not be a particularly close fit within the duct 14, and means such as the holes 46 are purposely added to permit added leakage from the system.

A multi-head magnetic transducer device generally designated at 16 for sensing the code on magnetically coded striping 23 of edges 20 of the film chips 12 is provided in the duct 14 at a position where the chips have assumed their angular position (at D in FIG. 2) and are moving with the air stream 33 within the duct 14. Alternatively, the transducer 16 could be positioned at the point between positions A and C where each chip 12 is caused to hinge prior to entering the air stream. It is advantageous to position the transducer 16 in the duct 14 at the same oblique angle assumed by the chips 12 to take advantage of the high velocity attained by the chips subsequent to pivoting. It should be noted that since each chip 12 is propelled past transducer 16 at a fixed angle, the relative velocity of each code bit with respect to the corresponding magnetic pickup head is constant, thus assuring equal output voltages for bits of like magnetization. In either case, the coded arrangement of magnetic bits on each chip 12 is sensed as they move one by one past the stacked reading heads 48 of the transducer 16. Thus, the output of a transducer 16 is an electrical signal corresponding to the unique code on each passing chip, the signal being transmitted to a comparator.

Figure 3:
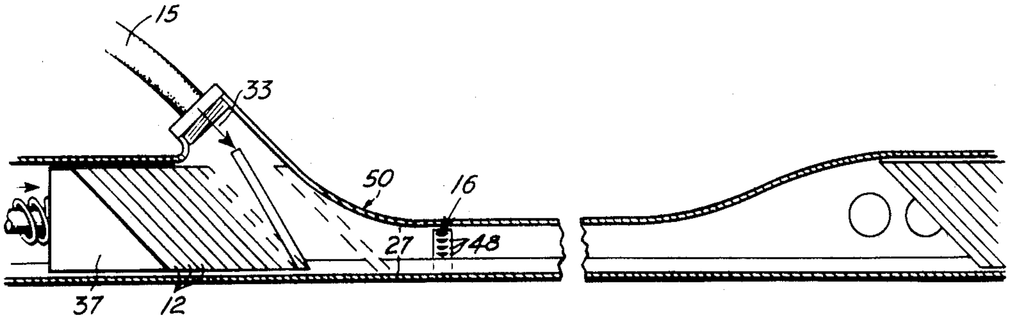
FIG. 3 is an alternative arrangement for causing individual chips to be propelled past a reading head mounted in a constricted length of the pneumatic duct.

A variation in the method of introducing the chips 12 into the duct 14 as well as a variation in reading the code on the edges 20 of the chips is illustrated in FIG. 3. The guide duct 14 is gradually constricted at 50 in the dimension 27 corresponding to the vertical dimension 28 of the chips 12. Thus, after a chip 12 has been introduced into duct 14, it will lay back in an increasingly oblique position during transportation through the duct 14. The code reading transducer 16 and associated electronics are adapted to read the magnetic code 22 along the edge 20 of the chip 12. A single channel transducer may be used here to read code 22 bit by bit in serial fashion as the chip moves by. Such a constricted physical arrangement of the duct 14 permits the use of a smaller duct and a smaller volume of air to transport the chip 12 at a given speed.

A particular advantage of dealing with information-bearing film chips 12 in the manner described is the relative simplicity in extracting the information from the surface 20 of any particular chip 12P. The semi-diagrammatic detail of FIG. 4 illustrates an arrangement for sensing passing chips 12 and selecting a particular chip for viewing on an external screen (not shown).

Figure 4:
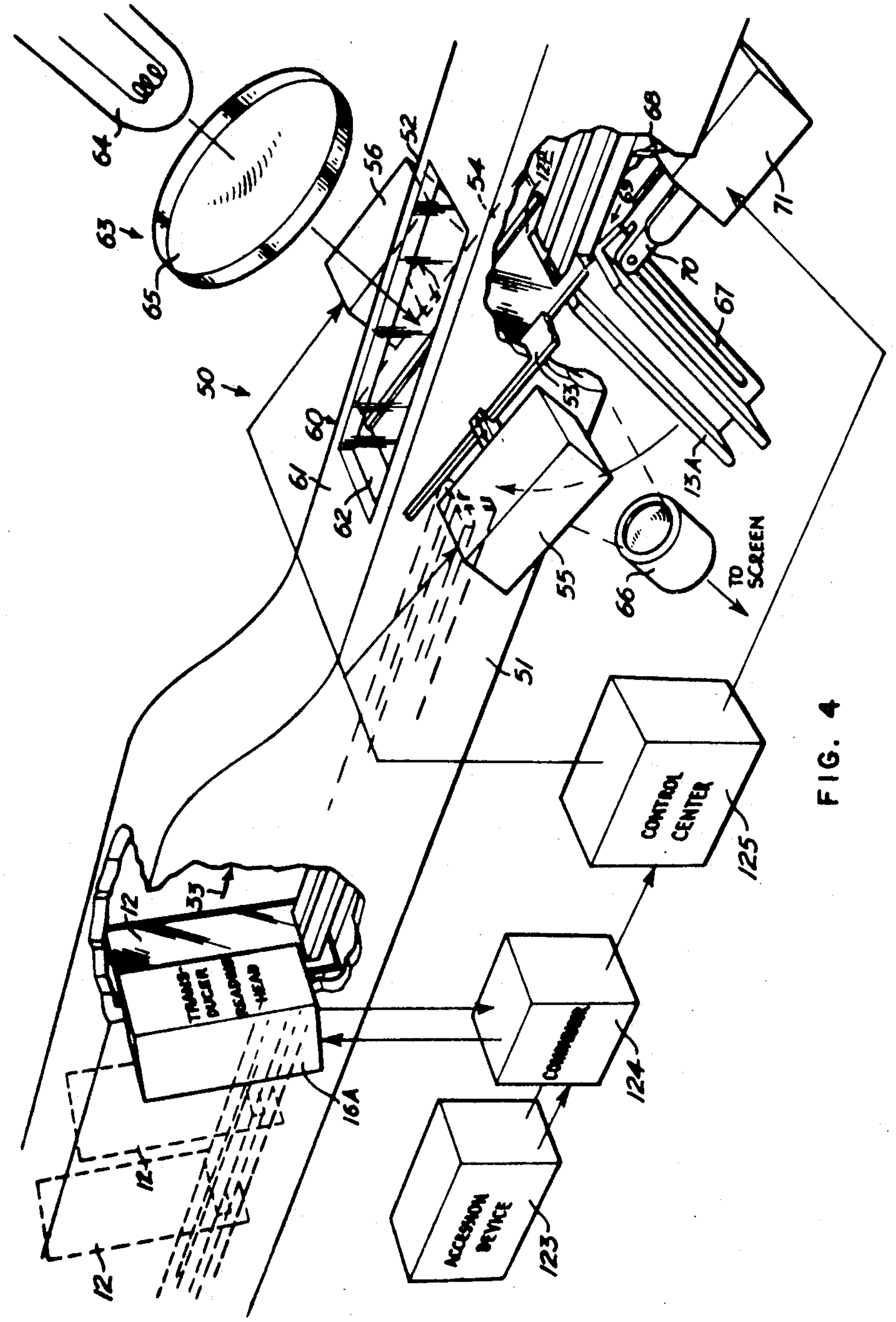
FIG. 4 is a diagrammatic perspective representation showing an optical system which may be used for displaying the information carried on a particular chip, the electromechanical system for placing the chip in the display position, and a block diagram of the relevant operative elements of the system.

A chip 12 is propelled through the duct 14 from left to right in FIG. 4. Reference is made to FIG. 2, for example, for a mechanism to feed the chips into the air stream one at a time. It will be apparent, that the feeding mechanism may be controlled so as to prevent the stacking of chips when a particular chip is in viewing position, since the feeding mechanism directly controls the feed of the chips. It will be noted in this embodiment that the duct 14 becomes increasingly constricted in its vertical dimension 27 shortly after the chips 12 pass a transducer sensing head station 16, entering the area of the duct network wherein the projecting arrangement generally designated by the numeral 50, is interposed. This constriction causes the chips 12 to assume an increasingly oblique angle and is a simple expedient for simplifying the projection optics 50. It should be emphasized, however, that this constriction is not necessary and may either be eliminated entirely or modified. On each side 51 and 52 of the duct 14 shutter-like members 53 and 54 are located in slots and arranged for in-and-out movement in respect to the interior of the duct. Solenoid elements 55 and 56 are connected to respective shutter members 53 and 54 and in this illustration normally retain the shutters interposed within the duct 14. Of course, in some applications the shutter members 53 and 54 will normally be withdrawn through their respective slots in the side walls 51 and 52 of the duct 14. Thus, in their normal position the shutters 53 and 54 will impede the forward progress of a passing chip 12P; the air pressure 33 in the duct 14 will keep the chip 12P forced against the shutters until they are withdrawn.

At the location 60 of the shutter members 53 and 54 the top 61 of the duct 14 is a window 62, formed of a transparent material such as glass or a suitable plastic. An optical system 63 comprising a light source 64, collecting lens 65 and projecting lens 66 are disposed in relation to the transparent window 62 to project the image of the chip 12P to a viewing screen, copying device or code reader (not shown) located outside the duct 14. It will be noted in FIG. 4 that unless provision is made to remove a section 13A of the rail 13 and its corresponding section 67 of duct wall 68, the projected image of a chip 12P will be impeded. Accordingly, the section 13A of the rail 13 and a section 67 of the bottom wall 68 of the duct 14 are hinged at 69 and connected by linkage 70 to a rapid response solenoid 71. Thus, after a chip 12P is caught by the shutters, the rail section 13A and duct section 67 may be moved out of the way so that the light projecting into the upper transparent window 62 and through the chip 12P to be viewed is unimpeded.

Various aspects of a complete and integrated chip filing system 11 have been explained in reference to the individual arrangements and characteristics of the components of such a system. It is apparent that an important function of the system is its ability to handle a multitude of distinct operations simultaneously. Storage sections may be provided within the network 24, reserved for chips 12 which can be sorted into various categories and classifications. Illustrated in FIG. 7 is a schematic representation of a system 11 embodying duct network 24 which includes a closed circuit loop 72 with four parallel and intersecting branches 73, 74, 75, and 76. Reserving explanation of the integrated system 11 for more detailed treatment later, it is in order at this point to describe a few alternative switching techniques which are to be used between the various branches 73–76 and the primary closed loop 72.

A switch mechanism in FIG. 5, indicated generally at 80 permits bi-directional movement of chips 12 between a single section 81 of duct 14 and a dual section 82. A movable section 83 of duct 14 is arranged to connect the single duct section 81 to either of the Y-connected ducts 84 or 85 of the dual section 82.

The movable section 83 is provided with a pivot or hinge point 86 at the termination 87 of the rail 13 in the section 81. This hinge point 86 between the fixed rail 13 and a rail section 88 in the movable duct 83, is designed to give a reasonably smooth joint in either one of the two possible positions in which the section may be located.

The free end 90 of the hinging section 83 has a slightly convex, arcuate shape to conform to a corresponding concave configuration at the entrance 91 to the Y-joint section 82 thereby mating with duct 84 or 85 in either of the two possible positions. Similarly, the track section 88 has a convex end 92 to mate with slightly concave ends 93 and 94 of rail sections 95 and 96 respectively in the dual section 82. Thus, a smooth, continuous track and duct are presented to a chip 12 moving in any direction through the switch 80.

Although air leakage is not of significant concern in the system 11, to protect the chips 12 from abrasion due to contamination of an unclean atmosphere, bellows-like elements 100 and 101 connect from each of side walls 102 and 103 of the single duct 81 to the respective side walls 104 and 105 of the hinging section 82. This provides enclosing means for the switch 82 both for contamination shielding and also serves to prevent unnecessary air leakage.

An alternative switching arrangement 110 is shown in FIGS. 6 and 6A. It will be seen that the walls indicated at 111 and 112 connecting the single section 81 and the dual section 82 are, in this variation, continuous. A section of rail 113 is arranged to move between two positions, connecting to either of the rails 95 or 96 in the Y-duct 82 alternately. The movable rail section 113 pivots at a hinge 114, the free end 115 making a substantially mating abutment with either of the ends 93 and 94 of converging tracks 95 and 96 respectively in the Y-duct 82.

Pivoting at the interconnection 116 of the converging ducts 82 is an upstanding rigid sheet 117 which can swing against either wall 102 or 103 at the terminal end 87 of the single duct 81 and is arranged to moved in opposite directions from the movable rail member 113. This element 117 provides an extended side for whichever of the converging ducts 84 or 85 is to receive a chip 12. As illustrated in FIG. 6A, a chip 12 moving from the single duct 81 at the right towards the dual ducts 82 will take the left branch 84 being guided by the movable rail 113 and the upstanding right wall element 117. In FIG. 6, the positions of the rail section 113 and the element 117 of the switch 110 connecting the right-hand branch 85 of FIG. 6 to the main line 81 are shown in phantom; the arrows 118 and 119 indicate the motion of these two elements 113 and 117 in operation.

Having described two switching units, reference is again made to the schematic diagram of an integrated pneumatic system 11 illustrated in FIG. 7. It will be noted that the system 11 comprises the closed loop 72 with the four branches 73–76, an output 121, an input 120, various transducers 16, sources of air pressure 15, and a viewing station 50 shown schematically as a block. One function of such a system 11 would be to sort a file of random, unclassified chips 12 into various predetermined categories.

Assuming an input of randomly sorted film chips 12 which are to be classified into four distinct categories, I, II, III, and IV, the chips will be brought into the system at the point marked input 120. A logical system must be programmed to cause only those chips in the file falling into the four desired categories to enter the closed loop 72 and be distributed to the four respective branches 73–76. All other chips 12 will go directly to the output 121.

A diagrammatic logic and control system 122 for the duct network 24 of FIG. 7 is shown in FIG. 10. The four desired categories of chips 12 are selected at an accession device 123 which transforms the designations of category into corresponding electrical signals. These signals, in turn, are transmitted to the groups of coincidence circuits making up a comparator 124 as chips 12 enter the input 120. The transducer 16A feeds the electrical equivalent of each chip's code to the comparator 124. If the appropriate signal from the accession device 123 is stored in the comparator 124, that stage provides a signal to a control center 125. When the four categories were selected, the accession device 123 instructs the control center 125 in a series of predetermined programs to follow a specified sequence of operations. For example, if it is desired to simply store chips in category I in branch 73, chips in that category passing transducer 16A will initiate a sequence which begins with withdrawal of the viewing station shuttters 53 and 54, and the proper setting of switches 130, 131, 132, 133 and 134 in the network 24 shown in FIG. 7. If category II is to be examined before filing, the shutters 53 and 54 of viewing station 50 catch each category II chip, keep it in view for a predetermined number of seconds and automatically releases the chips for entrance into the network 24, through switches 130, 131 and 132. More flexibility may be required regarding category III on the other hand. Therefore, the operator will determine how long chips are in the viewing station 50 but all other operations would be automatic as described with respect to category II. Chips not falling into any of the preselected categories are carried through the now open shutters 53 and 54, of the viewing station 50, and through switch 130 to the output 121.

If, for example, it is then desired to examine the chips 12 in any particular category now stored in one of the branches, the pneumatic system will supply air pressure into branch 73 for example, containing the particular desired category and switch the chips 12 into the closed loop 72 one at a time through switch 134. Each of these chips 12 will be brought past the reading head 16A immediately preceeding the projection station 50 through switch 135 so that either all or only certain selected chips may be viewed as they pass through the viewing stage. Another function of the system 11 would be an assessment and refiling of chips 12 stored within certain of the branch lines and removing certain of the chips 12 from the entire network 24 by guiding designated chips through to the output station at 121.

Having described briefly how the various elements of the invention can be combined into an operative system it is now useful to describe a few of the many possible modifications. A variant of the chip 12 with a re-entrant notch 32, guide track 12 and related system for handling chips is shown in FIGS. 8, 8A, 9 and 9A. It will be noted that the data bearing entity 150 is similar to the film chip 12 with the exception of one narrow edge 151. Here, this film chip 150 has at the narrow edge 151 a T-shaped mounting unit 152 which holds the chip and is adapted to slide in a slotted guide member 153.

In effect, the re-entrant notch 32 and track 13 of chips 12 are reversed. In this variant, the chip 150 has the T-shaped element 152 which is slideably and hingeably mounted between transverse elements 154 and 155 forming a slot 136 within the duct 14. While the chip 150 is illustrated with a separate T-shaped element 152 it is obviously feasible, particularly if the chip material is sufficiently stiff, to form the T integrally with the chip's body out of a single segment.

Switching of a chip 150 between ducts can be accomplished in apparatus 140 shown in FIGS. 9 and 9A, illustrating a single duct 141 merging with a Y-connected, dual duct section 142. The walls of the single duct 141 merge with the walls of the dual duct section 142 having a branch 143 and another branch 144. Similarly, the slotted members 153 branch into each of the dual duct legs 143 and 144 respectively.

For a bi-directional action, the switch 140 is provided with selectively insertable, upstanding shutter vanes 145 and 146 in the duct at 147. As will be seen in FIG. 9A, these thin vanes 145 and 146 may move up and down in slots 148 and 149, respectively, actuated by any suitable solenoid type devices (not shown). If switching a chip 12P from the single duct section 141 to section 143 is required, vane 145 is moved out of the interior of the duct 14 and vane 146 is moved upward into the duct at 147 as shown in FIG. 9A. It can be seen that switching the chips 150 requires a simpler arrangement than switches for chips 12. And, if merging of two branches is the only requirement, the switch for chip 150 can be completely static, i.e., the vanes 145 and 146 of switch 140 would not be necessary.

It is evident that still other variations will occur to those skilled in this art and it is not intended therefore to confine the invention to the precise embodiment described here, but rather to be governed by the spirit of the invention as defined within the ambit of the claims. Accordingly, I claim:

1. In an apparatus for processing a plurality of physically identical, uniquely edged coded data sheets, that comprises a substantially enclosed duct formed with guide means for said data bearing sheets, means for propelling said data bearing sheets through said duct along said guide means, and transducer means to sense said edge codes of said data bearing sheets while said sheets are propelled through said duct for locating a particular sheet said plurality of sheets, the improvement comprising:

engaging means downstream from said transducer means for holding said particular sheet when said transducer means senses the code of said particular sheet; and a transparent portion of said duct adjacent to said engaging means for viewing the data on said particular sheet held by said engaging means.

2. In the apparatus of claim 1 the improvement further comprising:

means for moving a movable section of said duct opposite said transparent portion to form an opening in said duct; and projection means adjacent said transparent portion and said movable section for projection an image of said data on said particular sheet through said opening in said duct while said particular sheet remains in said duct.

3. In an apparatus for processing a plurality of physically similar, data bearing sheets, each of said sheets being substantially rectangular and having a uniquely coded stripe of magnetic material along at least one long edge thereof, that comprises a guide rail for said sheets, means on each of said sheets for being mounted on said rail and slidably displaced thereon, a source of air pressure for displacing said sheets, a substantially enclosed duct with narrow and broad walls having an interior cross section comparable to the dimensions of said sheets, the narrow wall of said duct being slightly larger than the short edge of said sheets, the broad wall being substantially smaller than the long edges of said sheets, said rail being mounted longitudinally of said duct whereby said sheet is angularly disposed within said duct to form a piston like element when acted upon by said air pressure, magnetic transducer means for sensing the code on said stripes to locate a particular sheet from said plurality of sheets, and means for displacing each of said sheets one by one past said magnetic transducer means, the improvement comprising:

sheet engaging means downstream from said magnetic transducer means for holding said particular sheet when said magnetic transducer means senses the code of said particular sheet;

a transparent portion of said duct adjacent said sheet engaging means for viewing the data on said particular sheet held by said engaging means;

means for moving a movable section of said duct and said rail section adjacent said transparent portion to form an opening in said duct; and optical projection means adjacent said transparent portion and said movable section for projecting an image of the data on said particular sheet through said duct while said particular sheet remains in said duct.

4. In the apparatus of claim 3 the improvement further comprising sheet engaging means including a pair of shutter like members adapted for in and out movement through a pair of opposed slots in a pair of opposite walls of said duct and means for simultaneously moving said pair of shutter like members into said duct through said slots when said magnetic transducer means senses the code of said particular sheet to stop and to hold said particular sheet adjacent said transparent portion.

5. The apparatus of claim 4 further comprising drive means for displacing said movable section of said duct and rail when said sheet engaging means holds said particular sheet.

References Cited by the Examiner

UNITED STATES PATENTS

| | | | |
|---|---|---|---|
| 3,045,529 | 7/1962 | Kuehnle | 88—1 |
| 3,134,895 | 5/1964 | Welchman | 271—74 X |

NORTON ANSHER, *Primary Examiner.*

WILLIAM MISIEK, EVON C. BLUNK, *Examiners.*